Dec. 18, 1951 J. E. VISTAIN, JR 2,578,866

PLURAL NEEDLE PICKUP APPARATUS

Filed Dec. 23, 1948

INVENTOR.

James E. Vistain, Jr.

BY

J. D. Douglas

Att'y.

Patented Dec. 18, 1951 2,578,866

UNITED STATES PATENT OFFICE 2,578,866

PLURAL NEEDLE PICKUP APPARATUS

James E. Vistain, Jr., Chicago, Ill., assignor to Admiral Corporation, Chicago, Ill., a corporation of Delaware Application December 23, 1948, Serial No. 67,040

5 Claims. (Cl. 274—24)

This invention relates to improvements in phonograph pickup apparatus including a transducer adapted to engage a plurality of classes of records, the transducer being adapted to be carried by a movable pickup member.

More specifically, the invention comprises a transducer adapted to be associated rotatably with a movable pickup arm, the transducer including a plurality of needles in extension therefrom and each of the needles severally adapted to be turned into a position wherein they are adapted to engage severally and operably a different class of records as the transducer is rotated with respect to the pickup arm. Additionally, the invention comprehends means accessible from the exterior of the arm by which the transducer is adapted to be rotated to change needles, and indicator means from which can be determined, from above the levels of the pickup arm, which of the needles is in readiness for engagement with a record.

The matter of playing phonograph records differing considerably in the size and pitch of their sound grooves, and the speed at which they are adapted to be rotated is a problem which has previously been solved by providing record players with a plurality of pickup arms, one of which is provided with a needle adapted particularly for engagement with one class of records, e. g., microgroove or long playing records while the other pickup arm is provided with a needle adapted for engagement with short playing or conventional records. This involved a cumbersome construction with an apparently unnecessarily high cost of manufacture.

By my invention, I am able to use one pickup arm to perform the operations formerly performed by two such arms. This, of course, involves use of a transducer which, although slightly more expensive than either of the transducers employed on a two-pickup arm record player, enables a manufacturer, by its use to cut down on other costs incidental to the use of two pickup arms, thereby providing a record player which is available to the consumer at a price which is lower than the price of a two-pickup arm machine, and which, because of its added simplicity, involves fewer parts subject to maladjustment or fracture, and a consequent contribution to the phonograph art.

Other advantages of the invention will be apparent from the following specification when considered in conjunction with the accompanying drawings in which.

Figure 1:
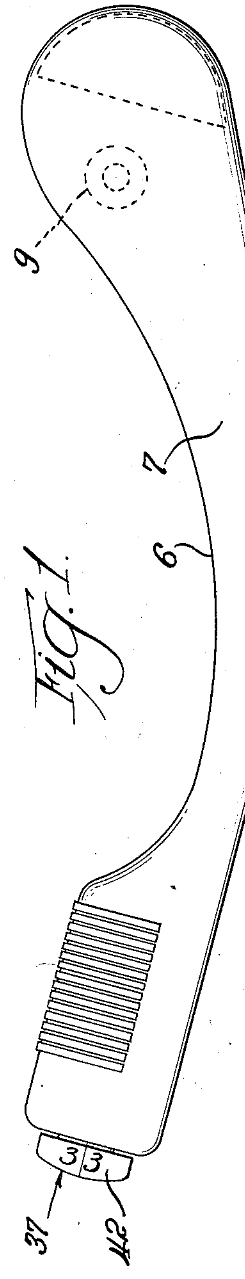
Fig. 1 is a top plan view of a pickup arm in conjunction with which the invention is incorporated.
Figures 2, 3, 4, 5:
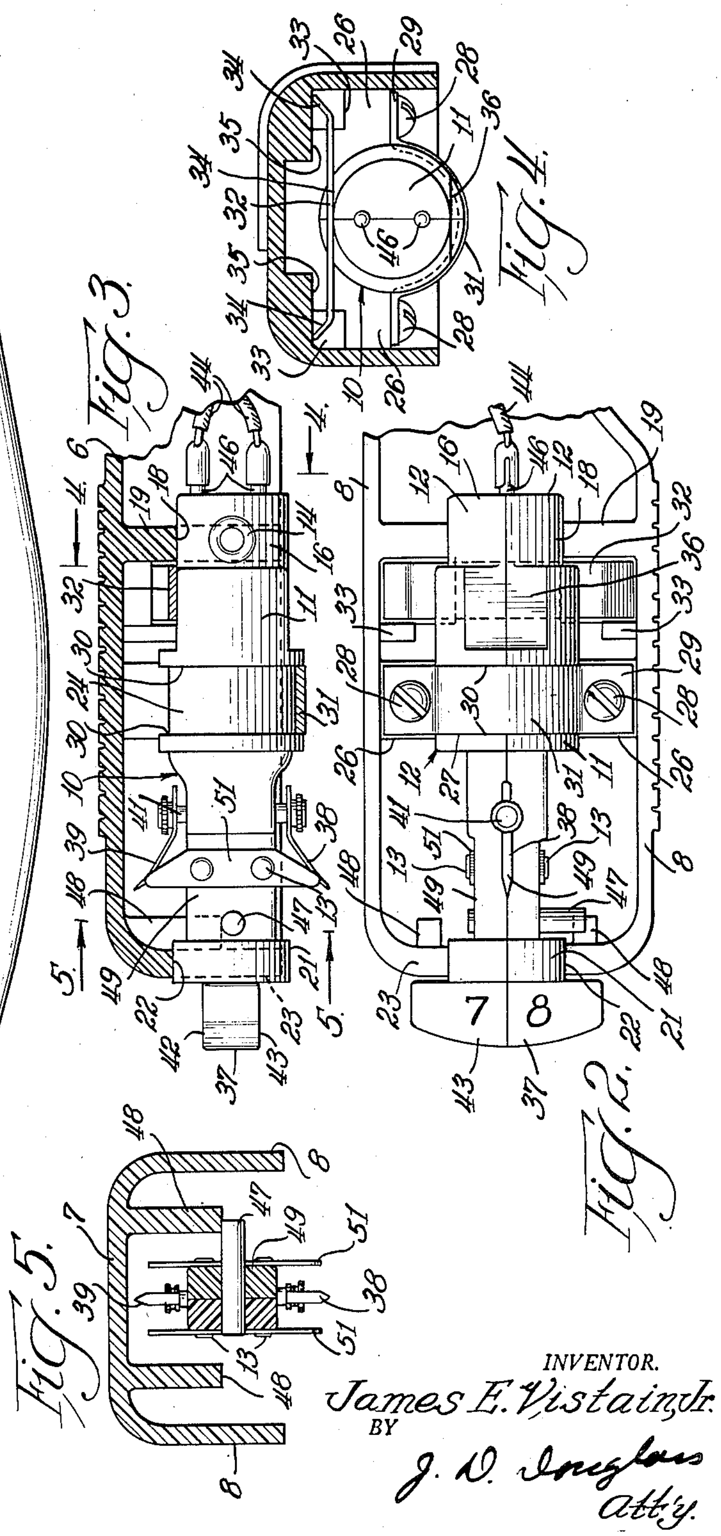
Fig. 2 is a fragmentary bottom plan view of the apparatus shown in Fig. 1, the view being drawn to a larger scale.
Fig. 3 is a side elevational view of the apparatus shown in Fig. 2, the pickup arm being broken away to reveal other parts.
Fig. 4 is a vertical section taken on line 4—4 of Fig. 3.
Fig. 5 is a vertical section on line 5—5 of Fig. 3.

In Fig. 1, wherein, for the purpose of illustration, is shown one embodiment of the invention, the reference character 6 is used to denote a pickup arm for a record player. The arm 6 may be of some plastic material such as Bakelite, and is of inverted U-shape in vertical section thus involving a top wall 7 from the edges of which side walls 8 extend downwardly. The arm is adapted to swing laterally about an axis centrally of a vertical support indicated, in Fig. 1, by the character 9.

To the swingable end of the pickup arm 6 is coupled a novel and versatile transducer 10. It is cylindrical in general formation and includes a rotary, composite body or barrel 11 formed from semi-cylindrical members 12 of some electrically non-conductive material such as Bakelite rigidly coupled to each other by rivets 13 and 14. A journal portion 16, of the barrel 11 is of reduced diameter, below the surface of which the extremities of the rivet 14 are countersunk so that said journal portion is adapted to be received within a bearing notch 18 in a partition wall 19 extending transversely of the pickup arm between its side walls 8. The barrel 11 also includes a second journal portion 21 which is adapted to be received in another bearing notch 22 in an end wall 23 of the pickup arm 6. In order to maintain rotatable relationship between the barrel 11 and the pickup arm, said barrel is provided with an annular groove 24 intermediate the journal portions 16 and 21. On either side of the groove 24 the arm 6 includes pads 26, to each of which the respective ends 29 of a metal strap 27 are anchored by screws 28. Between the ends 29 which form flat foot portions, the strap includes a portion 31 which is arcuate of the axis of barrel 11 so that it is adopted to grip the bottom of groove 24 frictionally, thereby eliminating the possibility of lateral play between the barrel and the arm 6. The strap 27 may be slightly resilient so as to exert sufficient frictional resistance to rotation of the barrel that the same is retained in whatever position to which it may be turned. Additionally, the edges of strap 27 are in intimate association with opposed radial sides 30 of the groove 24 so that the barrel 11 is restrained from displacement axially thereof.

It is essential, for a purpose to be made apparent hereinafter, that the transducer 10 be removably retained in either of two predetermined angular positions. This is effected by spring means which may appropriately take the form of a leaf spring 32 which is confined against displacement, laterally thereof by the wall 19, at one edge of the spring, and ears 33, extending toward each other from both of the pickup arm walls 8, at the other edge of the spring 32. For the sake of utilizing the elasticity of the spring 32, throughout its entire length, the two ends of said spring are bent upwardly as at 34. The extremities of the spring, thereby, are adapted to be pressed against pads 35 on either side of arm 6 between wall 19 and the ears 33 by the barrel 11. For this operation the barrel 11 is provided with a pair of retention surfaces which are flat surfaces diametrically opposed on the barrel, 34 and 36, either of which is adapted to press against a central region of the spring thereby deflecting it slightly. It will therefore be understood that the spring 32 is adapted to restrain the transducer yieldably against rotation from a first predetermined position provided by abutment of the flat surface 34 with the spring, or from a second predetermined position provided by abutment of the other flat surface 36 with said spring.

Means to turn the transducer manually from the first to the second predetermined position or from the second back to the first, in either case additionally deflecting the spring between said positions, is provided by a handle 37 externally of wall 23 of the pickup arm 6. Although the handle 37 may be a separate part rigidly coupled to the transducer, it preferably is a composite unit, the sections of which are integral with the members 12.

In order that undulations in the sound groove of two different classes of records may be conveyed to electrically responsive elements, not shown, within the transducer, two needles 38 and 39 are employed. Although the needles are preferably fixed to the respective ends of a single shaft 41 extending through the barrel 11, and therefore both adapted to convey vibratory motion to the same electrically responsive element, I also contemplate separate elements for each of the needles, the needles then being carried by separate shafts. In any case, there is a definite positional relationship between the position of each of the needles and one of the flat surfaces 34 and 36. This is such that, when the transducer 10 is in either of its predetermined positions, one of the needles is in extension downwardly for engagement with a particular class of records.

In order that the question of which needle is in readiness for record playing may be determined from a point above the level of the pickup arm 6, some suitable indicator means is employed. Of numerous indicating apparatuses which might be employed with this end in view, I prefer to so construct the handle 37 that opposed surfaces 42 and 43 are provided thereon, which are each in substantially horizontal position when the transducer is in either of its predetermined positions and hence when one of the needles is in downward extension. On the surface 42 I have, therefore, provided some identifying indicia such as the numeral "33" which is visible when the needle 38 is in downward extension, the needle 38 being adapted to engage the sound groove of a slow playing or microgroove record. The opposite side 43 is provided with some different indicia such as the numeral "78" which is visible, above the level of the pickup arm when the needle 39 is downward, the needle 39 being adapted to engage fast playing or conventional records.

Stop means is provided, as a safety measure, to restrict rotation of the transducer. This is essential because electrical conductor leads 44, anchored to immovable terminals not shown, are adapted to convey a current, modulated by the transducer, from terminal prongs 46 on the internal end of said transducer. Although any suitable mechanism to restrict rotation of the transducer may be employed, I prefer to use a stop pin 47 in extension through the transducer, adjacent the end wall 23 of the pickup arm. The pin 47 is in extension from one side only of the transducer and adapted to be swung through a half turn only due to the presence of pads 48 on the internal side of the pickup arm end wall 23.

The needles 38 and 39 are protected against undue shock by shield means. Such means is desirable due to the comparative fragility of the needles which might otherwise be bent beyond their limit of elasticity by sudden impact with a record and thereby rendered useless or their efficiency materially impaired. Therefore, that portion of the barrel 11 extended through by the rivets 13 is provided with opposed flat surfaces or flats 49 in substantially parallel relationship to the shaft 41. Shield members 51 are clamped against the flats 49 by the rivets 13. The shield members 51 may take the form of metal plates shorter than the distance between the record engageable ends of the two needles. During playing of records, the free ends of the shield members are spaced slightly from the surfaces of the records. Should, however, a group of records tumble from a magazine, for example, on to the pickup arm, their weight would merely deflect the downwardly extending needle until the shields rested on the turntable or a record thereon and no damage to the needle would follow.

Having thus described by invention in an embodiment thereof, I am aware that numerous and extensive departures may be made therefrom without departing from the spirit or scope of my invention.

I claim:

1. Pickup apparatus of the class which includes a mobile carrier member to which is coupled a transducer carrying a plurality of needles each of which is adapted to engage a separate class of records by alternate extension of one of the needles, the extension of the needles being carried out by rotating the transducer, said transducer being adapted to be adjustable by bearing means in connection with said transducer and said pickup arm, means in connection with the transducer by which said transducer is adapted to be rotated, and clamp means at least partially surrounding said transducer to hold it in rotational relationship to said carrier member said clamp means pressing said transducer into frictional engagement with said carrier member thereby providing for movably retaining the transducer in whatever angular position it is stationed.

2. Phonograph apparatus of the class which includes a pickup arm to which is coupled a transducer carrying a plurality of needles each of which is adapted to engage a separate class of records by alternate extension of one of the needles, the extension of the needles being carried out by angular movement of the transducer, said transducer being adapted to be adjustable angularly by bearings in connection with said transducer and said pickup arm, a handle in connection with the transducer, said handle being extended outwardly from said arm for rotation of said transducer, a clamp member anchored to said arm and engaging the transducer around at least a part of its periphery to hold said transducer in rotatable relationship with said arm, said clamp member pressing said transducer into frictional engagement with said arm whereby said transducer will be retained in any adjusted angular position.

3. Phonograph apparatus of the class which includes a swingable pickup arm in connection with which a transducer carrying a pair of needles is associated, one of the needles being adapted to engage one class and the other of the needles adapted to engage another class of records by alternate extension of one of said needles, the extension of the needles being carried out by means including spaced apart bearing surfaces circumferential of said transducer, a pair of spaced apart bearing notches on said arm, a clamping member in holding engagement with the lower surface of one of said bearing surfaces thereby holding the upper surfaces of the remaining bearing surfaces in engagement with said bearing notches, and a handle to rotate the transducer so that the needles are adapted to be extended severally for engagement with records of either class.

4. Phonograph apparatus of the class which includes a pickup arm with which a transducer is in association, said transducer adapted to be rotated into two predetermined positions and about an axis in fixed and substantially longitudinal relationship to the pickup arm to play two classes of records by means of a needle in extension from said transducer and adapted to engage a microgroove record when said transducer is in one of its predetermined positions, a second needle also in extension from said transducer and adapted to engage a coarse grooved record when said transducer is in the other of said predetermined positions, said needles being spaced angularly from each other peripherally of the transducer, a pair of flat surfaces on the periphery of said transducer, a spring anchored to the pickup arm and in spring pressed engagement with alternate ones of said flat surfaces whereby said transducer is releasably held in its alternate positions, and a handle on the transducer by which said transducer may be rotated for adjustment against the resistance of said spring.

5. A phonograph pickup apparatus comprising a pickup arm adapted to be mounted pivotally at one end, a head at the other end of said arm, said head being formed to provide a plurality of longitudinally spaced bearing surfaces, a transducer having a plurality of spaced journal surfaces, means to hold said transducer in said head with said journal surfaces in engagement with said bearing surfaces, said transducer also being formed with a plurality of flat surfaces thereon, spring means fixed to said head in pressed engagement with at least one of said flat surfaces whereby said transducer is held releasably in any one of a plurality of positions, and a plurality of pickup needles held by said transducer, each of said needles being thereby adapted to engage a record at the corresponding position of said transducer.

JAMES E. VISTAIN, JR.

REFERENCES CITED

The following references are of record in the file of this patent:

UNITED STATES PATENTS

| Number | Name | Date |
|---|---|---|
| 904,853 | Dyer et al. | Nov. 24, 1908 |
| 905,033 | Weber | Nov. 24, 1908 |
| 1,822,932 | Loughridge | Sept. 15, 1931 |
| 1,992,893 | Thomas | Feb. 26, 1935 |
| 2,087,135 | Wielage | July 13, 1937 |
| 2,280,763 | Hasbrouck | Apr. 21, 1942 |
| 2,479,894 | Andrews | Aug. 23, 1949 |

FOREIGN PATENTS

| Number | Country | Date |
|---|---|---|
| 78,729 | Switzerland | Sept. 2, 1918 |